UNITED STATES PATENT OFFICE.

JOHN COLLINS CLANCY, OF NIAGARA FALLS, NEW YORK, ASSIGNOR TO THE NITROGEN CORPORATION, OF PROVIDENCE, RHODE ISLAND, A CORPORATION OF RHODE ISLAND.

PRODUCTION OF AMMONIA.

1,352,182.　　　Specification of Letters Patent.　　Patented Sept. 7, 1920.

No Drawing. Original application filed March 23, 1916, Serial No. 86,078. Divided and this application filed January 14, 1920. Serial No. 351,362.

*To all whom it may concern:*

Be it known that I, JOHN COLLINS CLANCY, a citizen of the United States, residing at Niagara Falls, in the county of Niagara and State of New York, have invented certain new and useful Improvements in the Production of Ammonia, of which the following is a specification.

This invention relates to the process of producing ammonia from its elements through the agency of cyanamids as catalytic agents therefor, which process is particularly described and pointed out in the following specification and claims.

I have discovered that if a gaseous mixture containing nitrogen and hydrogen is passed in contact with a suitable metal cyanamid or mixture of such cyanamids, the nitrogen and hydrogen of said gaseous mixture may be caused to unite to form ammonia; said cyanamid or cyanamids acting catalytically in the reaction.

For example, calcium cyanamid, or potassium cyanamid, or sodium cyanamid answers well the purpose of the process; and when another suitable metal cyanamid, such as one of those hereinafter referred to, is mixed with the first, the production of ammonia may be caused to take place at a lower temperature; while the velocity of ammonia production is accelerated.

The number of said cyanamids in the mixture obviously need not be limited to two. Thus, by way of illustration:

A mixture composed of manganese cyanamid, cobalt cyanamid and sodium cyanamid may constitute the catalytic agent, such agent being prepared by using the following proportions, by weight: sodium cyanamid 100 parts; manganese cyanamid 10 parts; cobalt cyanamid 10 parts. The whole mixture is then intimately mixed with 80 parts of granular charcoal; the charcoal acting as a support for the catalytic agent. With a catalytic agent so prepared, nitrogen and hydrogen may be made to combine with the production of ammonia at a temperature of 500° to 600° C. and at a pressure preferably less than 100 atmospheres.

It will be understood that the invention is not limited to the exact materials given by way of exemplification nor to the proportions so given.

In carrying my invention into practice for the production of ammonia, about 140 grams of the immediately above mentioned catalytic mixture is placed in a catalytic chamber suitable for ammonia synthesis and there is passed in contact with such catalyzer a gas current preferably containing one volume of nitrogen and three volumes of hydrogen. With a pressure of gas traversing the chamber within a range of 25 to 100 atmospheres and at a temperature of treatment approximating 600° C. I have obtained synthetic ammonia to the extent that the ammonia gas leaving the treating chamber constituted up to 10 per cent. by volume of the total gas leaving the treating chamber; this percentage varying upon varying the pressure. The ammonia is removed from the gas discharged from the treating chamber in any suitable manner.

The present case is a division of my application entitled; Production of ammonia; Serial No. 86,078, filed March 23, 1916.

Having thus described my invention, what I claim is:

1. The process of producing ammonia which comprises effecting a reaction between heated nitrogen and hydrogen to synthetically yield said ammonia by passing a gaseous mixture containing said nitrogen and hydrogen under a high pressure in contact with a catalytic composition an active constituent of which is a cyanogen compound having potassium present in the base tnereof.

2. The process of producing ammonia which comprises effecting a reaction between heated nitrogen and hydrogen to synthetically yield said ammonia by passing a gaseous mixture containing said nitrogen and hydrogen under a high pressure in contact with a catalytic composition an active constituent of which is a cyanamid having potassium present in the base thereof.

3. The process of producing ammonia which comprises effecting a reaction between heated nitrogen and hydrogen to synthetically yield said ammonia by passing a gaseous mixture containing said nitrogen and hydrogen under a high pressure in contact with a catalytic composition which includes a plurality of co-acting metals, one of which is potassium, said potassium being united to carbon and nitrogen to form a cyanamid.

In testimony whereof I have affixed my signature, in the presence of two witnesses.

JOHN COLLINS CLANCY.

Witnesses:
FRANCES G. ALVERSON,
HOWARD C. RIPLEY.